(12) United States Patent
Aida (10) Patent No.: US 8,839,366 B2
(45) Date of Patent: Sep. 16, 2014

(54) VEHICULAR COMMUNICATION SYSTEM, MOBILE COMMUNICATION TERMINAL, AND VEHICULAR APPARATUS

(75) Inventor: Toshiyuki Aida, Anjo (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/545,315

(22) Filed: Jul. 10, 2012

(65) Prior Publication Data

US 2013/0019279 A1 Jan. 17, 2013

(30) Foreign Application Priority Data

Jul. 14, 2011 (JP) ................................. 2011-155669

(51) Int. Cl.
| | | |
|---|---|---|
| *H04L 29/06* | (2006.01) | |
| *G06F 21/00* | (2013.01) | |
| *H04W 4/00* | (2009.01) | |
| *H04M 1/725* | (2006.01) | |
| *H04W 4/04* | (2009.01) | |
| *H04M 1/60* | (2006.01) | |

(52) U.S. Cl.
CPC ............ *H04M 1/7253* (2013.01); *H04W 4/003* (2013.01); *H04W 4/046* (2013.01); *H04M 1/6075* (2013.01)
USPC ................................ 726/3; 713/168; 713/153

(58) Field of Classification Search
CPC ............ H04N 21/4104; H04N 21/414; H04N 21/41422; H04W 4/003; H04W 4/046
See application file for complete search history.

(56) References Cited

U.S. PATENT DOCUMENTS

| | | | |
|---|---|---|---|
| 2003/0060976 A1 | 3/2003 | Sato et al. | |
| 2004/0033821 A1* | 2/2004 | Slesak et al. | 455/575.1 |
| 2006/0218227 A1* | 9/2006 | Spear | 709/203 |
| 2007/0054672 A1 | 3/2007 | Onishi et al. | |
| 2008/0249889 A1 | 10/2008 | Kawakami | |
| 2009/0143081 A1 | 6/2009 | Onishi et al. | |
| 2011/0196711 A1* | 8/2011 | Craig et al. | 705/5 |

FOREIGN PATENT DOCUMENTS

| | | |
|---|---|---|
| JP | 11-259495 | 9/1999 |
| JP | 2003228532 A | 8/2003 |
| JP | 2005184271 A | 7/2005 |

(Continued)

OTHER PUBLICATIONS http://pressroom.toyota.com/releases/toyota+entune+awards+2011+ces.print, "Toyota Entune Receives Two Prestigious Awards at 2011 Consumer Electronics Show", Jan. 31, 2011.

(Continued)

*Primary Examiner* — Izunna Okeke
(74) *Attorney, Agent, or Firm* — Harness, Dickey & Pierce, PLC (57) ABSTRACT

A vehicular communication system includes a mobile communication terminal, an in-vehicle apparatus, and a distribution center to distribute a content. The mobile communication terminal includes a terminal-side application to execute a content. The in-vehicle apparatus includes a vehicle-side application to execute a content. If the mobile communication terminal and the in-vehicle apparatus are not communicably connected, the terminal-side application of the mobile communication terminal executes a content acquired from the distribution center. If the mobile communication terminal and the in-vehicle apparatus are communicably connected, the terminal-side application and the vehicle-side application are caused to be cooperative and the vehicle-side application of the in-vehicle apparatus is enabled to execute a content acquired by the mobile communication terminal.

15 Claims, 6 Drawing Sheets

(56) References Cited

FOREIGN PATENT DOCUMENTS

| JP | 2008-193337 | 8/2008 |
| JP | 2010-127781 A | 6/2010 |
| JP | 2010-199718 | 9/2010 |
| JP | 2010-217944 | 9/2010 |
| JP | 2010-250376 A | 11/2010 |

OTHER PUBLICATIONS

Office Action mailed Jun. 11, 2013 in the corresponding JP Application No. 2011-155669 with English translation thereof.
Office Action mailed Feb. 21, 2014 in corresponding Japanese Application No. 2011-155669.

* cited by examiner

VEHICULAR COMMUNICATION SYSTEM, MOBILE COMMUNICATION TERMINAL, AND VEHICULAR APPARATUS

CROSS REFERENCE TO RELATED APPLICATION

This application is based on Japanese Patent Application No. 2011-155669 filed on Jul. 14, 2011, the disclosure of which is incorporated herein by reference.

TECHNICAL FIELD

The present disclosure relates to a vehicular communication system including a distribution center to distribute contents, a mobile communication terminal capable of performing a content, and a vehicular apparatus capable of performing a content and communicably connected to the mobile communication terminal. More particularly, the present disclosure relates to the mobile communication terminal and the vehicular apparatus that configure the vehicular communication system.

BACKGROUND

[Patent document 1] JP 2003-106854 A (US 2003/0060976 A)

As disclosed in Patent document 1, for example, there is conventionally known a system in which a vehicular apparatus such as a navigation system connects a mobile communication terminal such as a mobile telephone to an outside communication network while the mobile communication terminal functions as a communication medium.

The system as disclosed in Patent document 1 uses the mobile communication terminal simply as a communication medium, that is, a modem. Recently, sophisticated mobile communication terminals such as smart phones are gradually coming into use. Using the mobile communication terminal simply as a modem limits the high performance of the mobile communication terminal.

SUMMARY

The present disclosure has been made in consideration of the foregoing. It is therefore an object of the present disclosure to provide a vehicular communication system taking full advantage of a sophisticated mobile communication terminal. Another object of the present disclosure is to provide a mobile communication terminal and a vehicular apparatus that configure the vehicular communication system.

To achieve the above object, according to an example of the present disclosure, a vehicular communication system is provided to include a distribution center that distributes a content, a mobile communication terminal, and a vehicular apparatus. The mobile communication terminal includes a content acquisition section to execute the content distributed from the distribution center, and a terminal-side application to execute the content. The vehicular apparatus includes a vehicle-side application to execute a content. The vehicular apparatus is enabled to be communicably connected with the mobile communication terminal. Herein: when the mobile communication terminal and the vehicular apparatus are not connected, the terminal-side application of the mobile communication terminal executes a content acquired by the content acquisition section; and when the mobile communication terminal and the vehicular apparatus are connected, the terminal-side application and the vehicle-side application cooperate with each other and the vehicle-side application of the vehicular apparatus executes a content acquired by the content acquisition section of the mobile communication terminal.

The vehicular communication system provides the sophisticated mobile communication terminal with a content acquisition section. The mobile communication terminal primarily acquires contents from a distribution center. The vehicular communication system can acquire contents from the distribution center while taking full advantage of the high performance of the mobile communication terminal.

Further, according to another example of the present disclosure, a mobile communication terminal is provided as described in the above example of the vehicular communication system. Yet further, according to another example of the present disclosure, a vehicular apparatus is provided as described in the above example of the vehicular communication system.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment of the present disclosure will be described in further detail with reference to the accompanying drawings. In the following description, Bluetooth (registered trademark) is simply referred to as BT.

Figure 1:
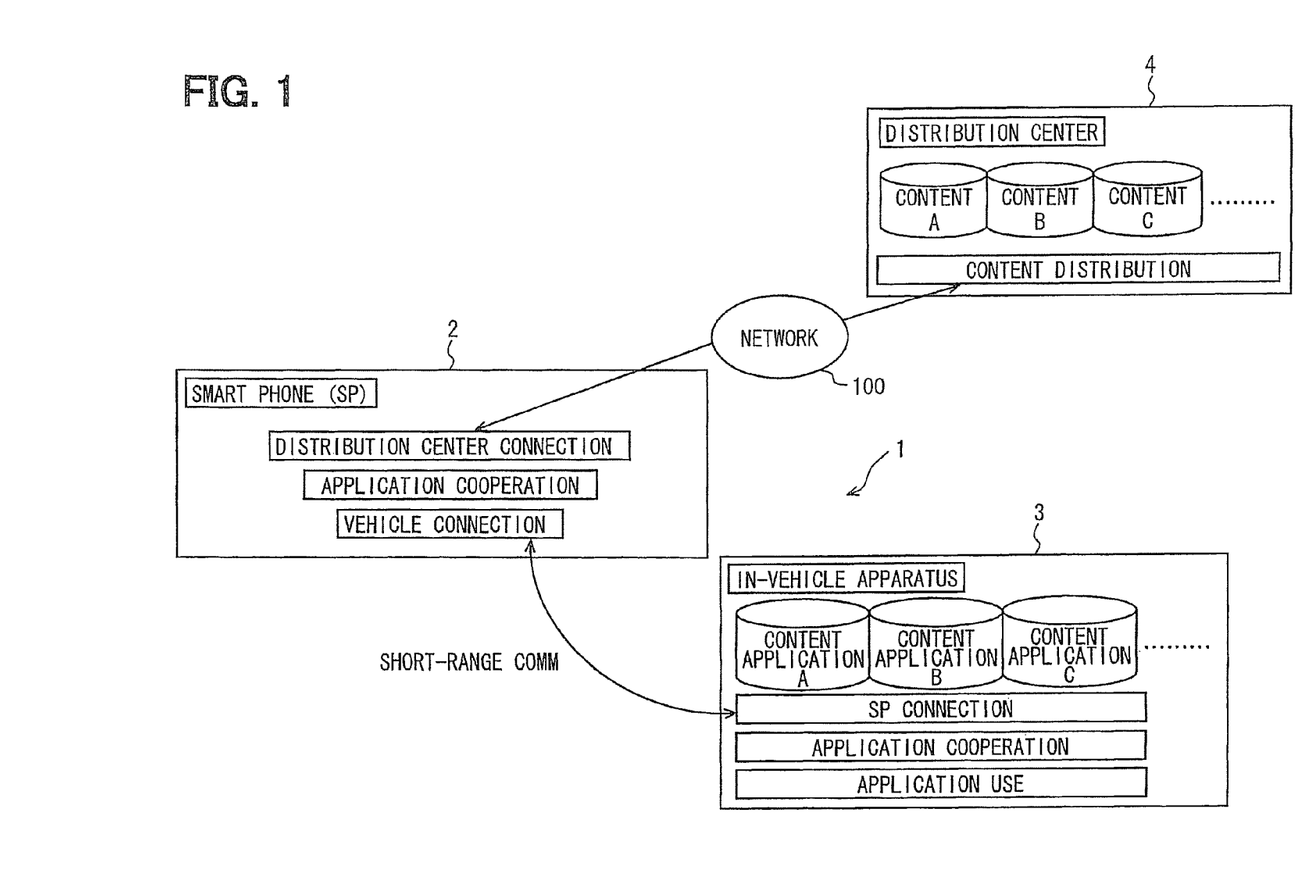
FIG. 1 schematically shows an overall configuration of a vehicular communication system according to an embodiment of the present disclosure.

As shown in FIG. 1, a vehicular communication system 1 includes a mobile communication terminal 2, an in-vehicle apparatus 3 as a vehicular apparatus, and a distribution center 4. The mobile communication terminal 2 according to the embodiment represents a smart phone that is sophisticated more and more in recent years. The mobile communication terminal 2 connects to the outside distribution center 4 through a communication network 100 to acquire contents distributed from the distribution center 4. The distribution center 4 stores various contents associated with Internet radios, music distribution services, various search services, and various reservation services. The distribution center 4 also receives a distribution request from outside terminals or units and distributes a content corresponding to the request through the communication network 100. FIG. 1 shows contents A through C.

Figure 2:
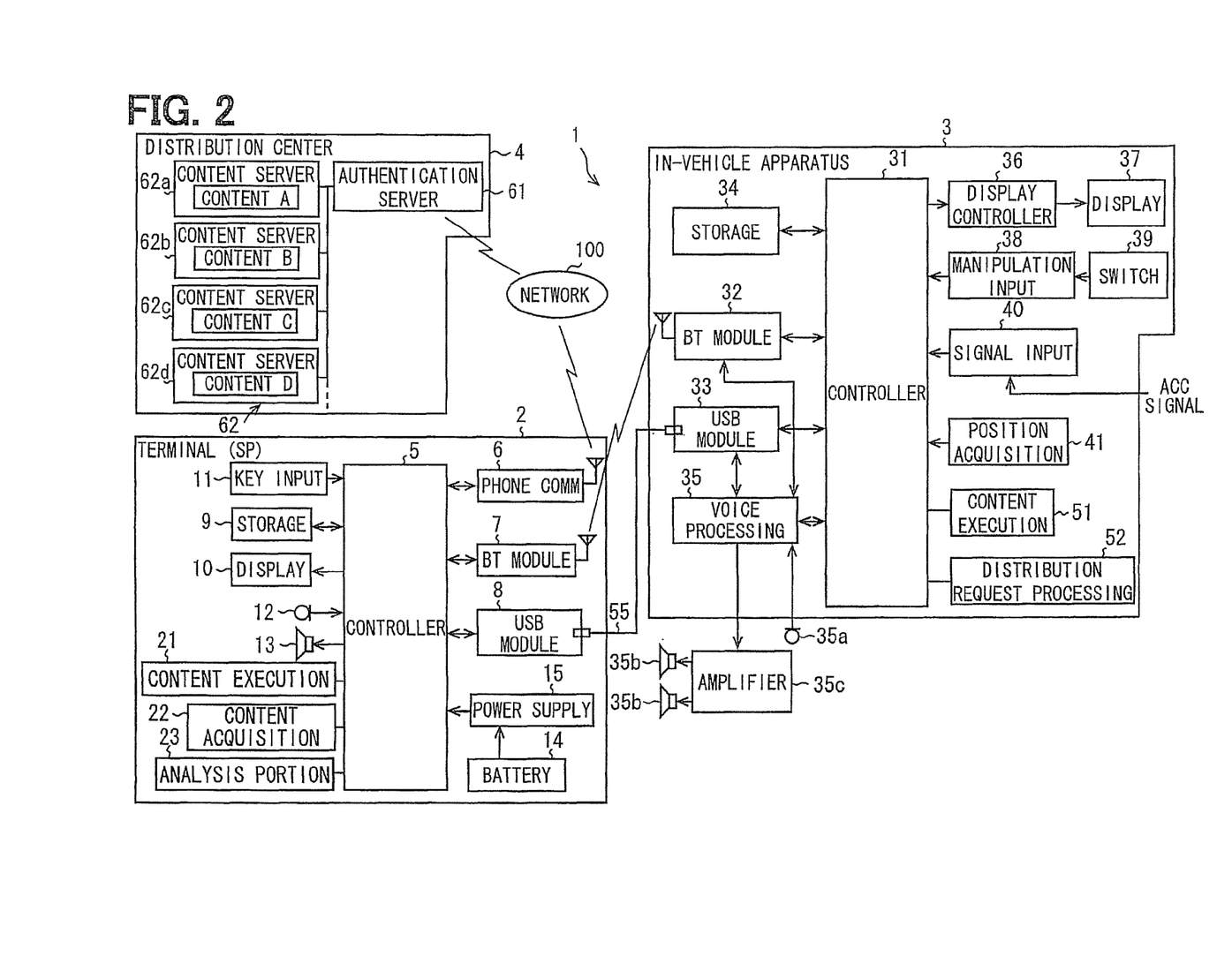
FIG. 2 schematically shows a mobile communication terminal, an in-vehicle apparatus, and a distribution center configuring the vehicular communication system.

As shown in FIG. 2, the mobile communication terminal 2 includes a terminal controller 5, a telephone communication portion 6, a BT module 7, a USB (Universal Serial Bus) module 8, a storage portion 9, a display portion 10, a key input portion 11, a microphone 12, a speaker 13, and a power supply portion 15 connected to a battery 14. The terminal controller 5 is provided as a known computer including a CPU, RAM, ROM, and an I/O bus (not shown). The terminal controller 5 controls overall operations of the mobile communication terminal 2 in accordance with a computer program stored in the ROM or the storage portion 9. The overall operations include communication operation, data management operation, and content acquisition and execution to be described later.

The terminal controller 5 executes a computer program to virtually provide a content execution section 21, a content acquisition section 22, and an analysis section 23 as software. A content execution function of a terminal-side application may embody the content execution section 21. The content acquisition section 22 is equivalent to a content acquisition device or means. The analysis section 23 is equivalent to an analysis device or means.

The content execution section 21 performs a content execution process that executes various contents. The content acquisition section 22 performs a content acquisition process that acquires contents from the distribution center 4. The analysis section 23 performs an analysis process that analyzes whether connection to the distribution center 4 is needed to acquire a content requested from the in-vehicle apparatus 3 for distribution.

If the terminal controller 5 is not connected to the in-vehicle apparatus 3, the mobile communication terminal 2 can independently execute various contents using the content execution process of the content execution section 21.

The telephone communication portion 6 performs telephone communication with the communication network 100. The communication network 100 includes facilities such as a mobile telephone base station and a base station controller that provide mobile telephone communication services using existing public line networks. The terminal controller 5 allows the content acquisition section 22 to execute the content acquisition process and thereby allows the telephone communication portion 6 to acquire various contents from the distribution center 4 connected to the communication network 100.

The BT module 7 performs BT communication as short range wireless communication with the in-vehicle apparatus 3 using a BT communication line. The BT module 7 can simultaneously connect multiple profiles compliant with the BT communication standard. That is, the BT module 7 is capable of multi-connection. The profiles signify communication profiles defined for respective functions. The following profiles are available. SPP (Serial Port Profile) specifies data communication available for virtual serial ports. HFP (Hands Free Profile) specifies hands-free conversation. PBAP (Phone Book Access Profile) specifies phone book data transfer. OPP (Object Push Profile) also specifies phone book data transfer. A2DP (Advanced Audio Distribution Profile) specifies audio data transfer. AVRCP (Audio/Video Remote Control Profile) specifies transfer of control data concerning audio data control. DUN (Dial-up Networking Profile) specifies dial-up connection to the Internet. MAP (Message Access Profile) specifies e-mail data transfer.

The BT module 7 exchanges application execution state information with the in-vehicle apparatus 3. The application execution state information relates to content types and manipulations on contents. A manipulation on a content signifies executing the content, stopping the content, or selecting the content, for example.

In a case of music content, for example, the application execution state information contains information about a content execution state such as a music type and duration of the music replayed so far or information about manipulations such as fast-forwarding or stopping the music. The application execution state information further includes an application execution state itself. Application execution states include the type of an application program such as a music reproduction application or a Web browser activated to execute the content, a manipulation to start or stop the application program, and a user manipulation to choose from application programs. In other words, the application execution state signifies information containing various user manipulations to execute an intended content. The BT module 7 is connectable to a microphone (not shown) compatible with the hands-free function.

The USB module 8 performs data communication with the in-vehicle apparatus 3 through a USB communication line. The storage portion 9 contains a storage area to store various data. The storage portion 9 stores various computer programs and contents, various programs such as a content application to execute the content and a cooperative application to perform an application cooperation function, and data used for the programs. The storage portion 9 may be provided as a removable medium such as a memory card. The terminal-side application is included in the applications stored in the storage portion 9.

The display portion 10 is provided as a liquid crystal display or an organic EL display, for example. The display portion 10 displays a variety of information based on a display instruction signal from the terminal controller 5. For example, the display portion 10 displays a known phone book or a received e-mail message, information about an acquired content, and a manipulation window for the content.

The key input portion 11 is provided with various manipulation keys (not shown). The manipulation keys include a touch switch or a touch panel provided for a screen of the display portion 10 and the other switches provided around or near the display portion 10. The touch switch is compatible with any of known technologies such as the pressure-sensitive technology, the electromagnetic induction technology, the electrostatic capacitance technology, or a combination of these. The key input portion 11 outputs a manipulation detection signal to the terminal controller 5. The manipulation detection signal corresponds to a user key manipulation. The terminal controller 5 analyzes the manipulation detection signal supplied from the key input portion 11 and identifies the user manipulation. The terminal controller 5 also reports the user manipulation to the in-vehicle apparatus 3 through the BT communication. The in-vehicle apparatus 3 is identified as a connection party.

During conversation, the microphone 12 inputs the voice uttered from a user as transmission voice. The speaker 13 outputs reception voice the telephone communication portion 6 receives from an intended party. The speaker 13 also outputs audio data contained in a content being executed. The battery 14 is provided so as to be attachable to and detachable from a body of the mobile communication terminal 2. The battery 14 supplies operating power. The power supply portion 15 supplies the operating power to respective function portions such as the terminal controller 5.

The in-vehicle apparatus 3 includes an apparatus controller 31, a BT module 32, a USB module 33, a storage portion 34, a voice processing portion 35, a display controller 36, a display portion 37, a manipulation input portion 38, a manipulation switch 39, a signal input portion 40, and a position acquisition portion 41. The in-vehicle apparatus 3 according to the embodiment is mounted in a vehicle compartment of a vehicle. The apparatus controller 31 of the in-vehicle apparatus 3 is provided as a known computer including a CPU, RAM, ROM, and an I/O bus (not shown). The apparatus controller 31 controls overall operations of the in-vehicle apparatus 3 in accordance with a computer program stored in the ROM or the storage portion 34. The overall operations include communication operation and data management operation.

The apparatus controller 31 executes a computer program to virtually provide a content execution section 51 and a distribution request processing section 52 as software. A content execution function of a vehicle-side application may embody the content execution section 51. The distribution request processing section 52 is equivalent to a distribution request section, device, or means.

The content execution section 51 performs a content execution process that executes various contents. The distribution request processing section 52 performs a content distribution request process that requests a content to be distributed.

If the apparatus controller 31 is not connected to the mobile communication terminal 2, the in-vehicle apparatus 3 can independently execute various contents using the content execution process of the content execution section 51. If connected to the mobile communication terminal 2, the apparatus controller 31 inherits a content from the mobile communication terminal 2 that acquired the content from the distribution center 4. The apparatus controller 31 can use the content execution process of the content execution section 51 to execute the inherited content in cooperation with the mobile communication terminal 2.

The BT module 32 performs data communication with the mobile communication terminal 2 through the BT communication line. The BT module 32 supplies notifications to the mobile communication terminal 2. Specifically, the BT module 32 transmits or receives a content acquired by the mobile communication terminal 2 and receives a content-related manipulation performed on the mobile communication terminal 2. The BT module 32 also transmits the following to the mobile communication terminal 2: the state of a content executed in the in-vehicle apparatus 3 and a manipulation performed on the manipulation input portion 38.

The USB module 33 is connected to the mobile communication terminal 2 through a connection cable 55. The USB module 33 performs data communication with the mobile communication terminal 2 through the USB communication line. The storage portion 34 is provided as a non-volatile storage medium such as a hard disk drive. The storage portion 34 stores various computer programs and contents, content applications to execute the contents, cooperative applications to perform application cooperation functions, and data used for the programs. The storage portion 34 may be built into the in-vehicle apparatus 3 or may be provided as an external storage medium attachable to and detachable from the in-vehicle apparatus 3. The vehicle-side application is contained in the applications stored in the storage portion 34.

The voice processing portion 35 connects with a microphone 35a and an audio amplifier 35c having a speaker 35b. The voice processing portion 35 connects with the apparatus controller 31, the BT module 32, and the USB module 33. The voice processing portion 35 performs a known voice input/output process. Specifically, the microphone 35a is provided in the vehicle compartment and is positioned near a steering unit where the voice uttered from a user can be easily collected, for example. The audio amplifier 35c is provided outside the in-vehicle apparatus 3 in the vehicle compartment. The voice processing portion 35 outputs an instruction to manipulate the in-vehicle apparatus 3 to the apparatus controller 31 based on the voice input from the microphone 35a. In addition, the voice processing portion 35 outputs the voice from the speaker 35b based on instructions from the apparatus controller 31 and the BT module 32. The speaker 35b according to the embodiment is provided as a stereo speaker.

The display controller 36 connects with the display portion 37. Based on an instruction from the apparatus controller 31, the display controller 36 controls a display window (i.e., a content to be displayed) on the display portion 37. The display portion 37 is provided as a liquid crystal display or an organic EL display, for example. The display portion 37 displays a variety of information on a screen based on a display instruction signal from the display controller 36. The display portion 37 is provided with a touch switch or a touch panel on the screen. The touch switch is compatible with any of known technologies such as the pressure-sensitive technology, the electromagnetic induction technology, the electrostatic capacitance technology, or a combination of these. The display portion 37 displays a manipulation of the in-vehicle apparatus 3, a content execution state, and a manipulation window to enter manipulations for a content.

The manipulation input portion 38 connects with the manipulation switch 39. The manipulation switch 39 includes multiple switches provided around the display portion 37. The manipulation input portion 38 detects a user manipulation on the touch panel and the manipulation switch 39 and outputs a corresponding manipulation detection signal to the apparatus controller 31. Specifically, a user manipulates the touch switch and allows the manipulation switch 39 to supply a manipulation detection signal. The manipulation input portion 38 outputs the supplied manipulation detection signal to the apparatus controller 31. The apparatus controller 31 analyzes the manipulation detection signal supplied from the manipulation input portion 38 and identifies the user manipulation content. If the manipulation detection signal is supplied from the manipulation input portion 38, the apparatus controller 31 outputs a display instruction signal to the display controller 36 based on the identified manipulation content. The apparatus controller 31 also notifies the manipulation content to the mobile communication terminal 2 as a connection party using the BT communication through the BT module 32.

The signal input portion 40 connects with an ACC (accessory) switch (not shown) mounted on a vehicle. If an ACC signal is supplied from the ACC switch, the signal input portion 40 outputs the ACC signal to the apparatus controller 31. The apparatus controller 31 controls the on/off state of a power supply circuit (not shown) based on the on/off state of the ACC signal output from the signal input portion 40. The apparatus controller 31 turns on the power supply circuit to start the in-vehicle apparatus 3 when the ACC signal changes to the on state from the off state. The apparatus controller 31 turns off the power supply circuit to stop the in-vehicle apparatus 3 when the ACC signal changes to the off state from the on state. A microcomputer different from the apparatus controller 31 may be provided to turn on or off the power supply circuit.

The position acquisition portion 41 includes, though not shown, a geomagnetic sensor, a gyroscope, a vehicle speed sensor, and a GPS receiver according to known technologies. The position acquisition portion 41 is supplied with detection signals from the geomagnetic sensor, the gyroscope, the vehicle speed sensor, and the GPS receiver. The position acquisition portion 41 complements the detection signals each other to acquire position information about the vehicle. The position acquisition portion 41 need not include all of these components if it can acquire the vehicle position information with required detection accuracy. The position acquisition portion 41 may be combined with a steering sensor to detect a steering angle and a wheel sensor to detect each wheel rotation. The position acquisition portion 41 outputs the acquired vehicle position information to the apparatus controller 31. The apparatus controller 31 performs a navigation process based on the vehicle position information acquired in the position acquisition portion 41. That is, the embodiment uses a navigation system as the in-vehicle apparatus 3.

In the vehicular communication system 1 according to the above-mentioned configuration, the mobile communication terminal 2 and the in-vehicle apparatus 3 may not be connected communicably or may not establish connection based on the BT communication. In such a case, the mobile communication terminal 2 can operate independently. The mobile communication terminal 2 and the in-vehicle apparatus 3 can operate cooperatively with each other when they are connected communicably.

Specifically, the mobile communication terminal 2 itself acquires and executes a content if the mobile communication terminal 2 is not communicably connected to the in-vehicle apparatus 3. For example, suppose the distribution center 4 uses a content distribution function to distribute content A. In this case, the mobile communication terminal 2 itself acquires content A in accordance with a user manipulation on the mobile communication terminal 2. The mobile communication terminal 2 executes content A using an associated content application A, which is an application program associated with or corresponding to content A. Control operations of the mobile communication terminal 2 itself will be described later in detail.

Figure 3:
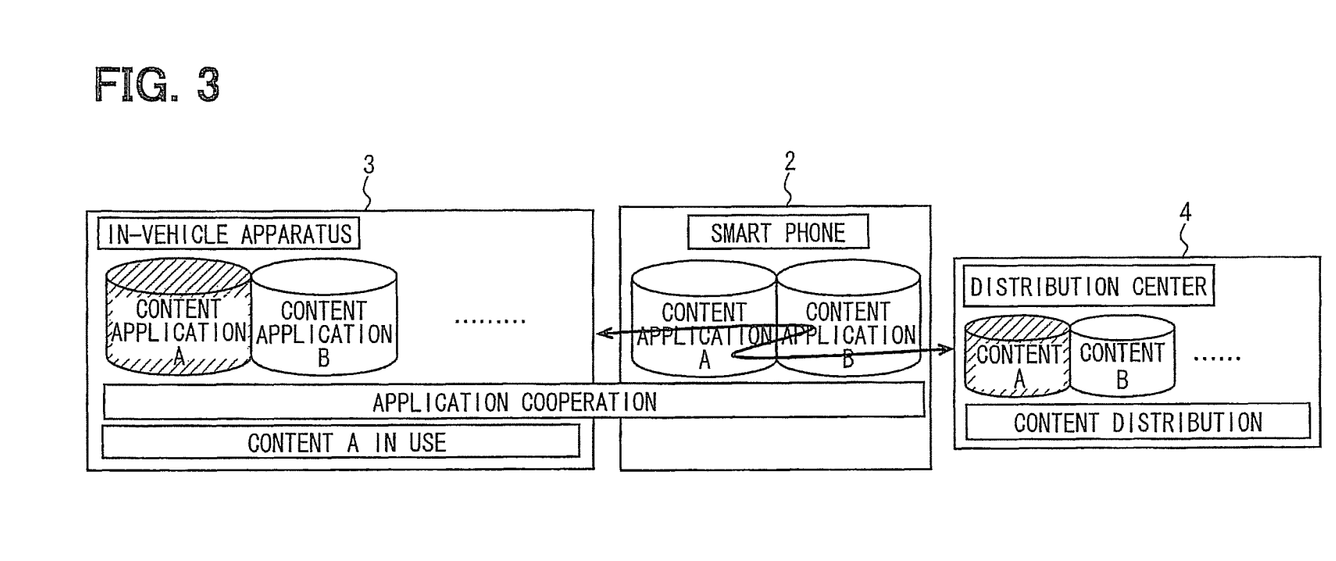
FIG. 3 is a function block diagram showing a state of connection established between the mobile communication terminal and the in-vehicle apparatus.

On the other hand, suppose the mobile communication terminal is communicably connected to the in-vehicle apparatus 3. In this case, the mobile communication terminal 2 starts its cooperative application. The in-vehicle apparatus 3 starts its cooperative application. As shown in FIG. 3, the application cooperation function is enabled for the mobile communication terminal 2 and the in-vehicle apparatus 3. As a result, the in-vehicle apparatus 3 can execute a content acquired by the mobile communication terminal 2. For example, suppose the content distribution function of the distribution center 4 distributes content A. Then, the mobile communication terminal 2 acquires content A in accordance with a request from the in-vehicle apparatus 3. The mobile communication terminal 2 transfers the acquired content A to the in-vehicle apparatus 3. The in-vehicle apparatus 3 acquires content A from the mobile communication terminal 2 and executes content A using an associated content application A, which is an application program associated with or corresponding to content A.

Figure 4:
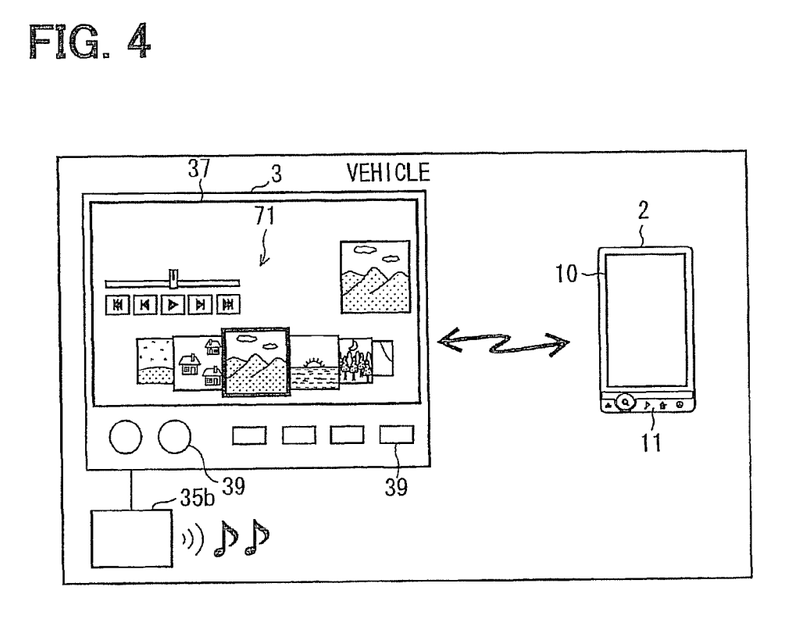
FIG. 4 schematically shows cooperation of the mobile communication terminal and the in-vehicle apparatus that are connected to each other.

If the application cooperation function is enabled, the mobile communication terminal 2 functions as a communication medium that transfers content A acquired from the distribution center 4. When connected through the BT communication, the mobile communication terminal 2 and the in-vehicle apparatus 3 start the respective cooperative applications to cooperate with each other. The in-vehicle apparatus 3 executes the content acquired by the mobile communication terminal 2 in cooperation with each other. As shown in FIG. 4, the mobile communication terminal 2 is carried into the vehicle provided with the in-vehicle apparatus 3. The BT communication line is established between the mobile communication terminal 2 and the in-vehicle apparatus 3. In this state, for example, the speaker 35b connected to the in-vehicle apparatus 3 outputs the music contained in content A used for music distribution. The display portion 37 of the in-vehicle apparatus 3 displays a manipulation menu window 71. The manipulation menu window 71 is displayed during execution of content application A and is used to manipulate content A. FIG. 4 omits the communication network 100 and the distribution center 4.

In this case, the mobile communication terminal 2 basically displays nothing on the display portion 10. However, the display portion 10 may display a window or image indicating that the cooperative application is running or indicating that the in-vehicle apparatus 3 is executing content application A. The embodiment prevents the mobile communication terminal 2 from operating content A. Accordingly, the user manipulates content A using the in-vehicle apparatus 3, not the mobile communication terminal 2. In the vehicular communication system 1 as a short range communication system, manipulations on the in-vehicle apparatus 3 are enabled when the mobile communication terminal 2 and the in-vehicle apparatus 3 are connected; thereby the safety is prevented from degrading. This is because the safety might degrade if the user manipulates or stares the mobile communication terminal 2 using manipulation keys or windows generally smaller than those of the in-vehicle apparatus 3. In cases that the application cooperation function is enabled, it can be provided that the display portion 10 or the speaker 13 of the mobile communication terminal 2 outputs a content executed on the in-vehicle apparatus 3.

As shown in FIG. 2, the distribution center 4 includes an authentication server 61 and a content server 62. The authentication server 61 performs processes related to connection with the mobile communication terminal and charging. The authentication server 61 identifies a specific mobile communication terminal as a registered terminal. For example, the registered terminal belongs to an owner who contracts a content distribution service provided from the vehicular communication system 1. If the connected mobile communication terminal is a registered terminal, the authentication server 61 authenticates the mobile communication terminal as a distribution-permitted terminal. In addition, the authentication server 61 transmits a content distribution instruction to the content server 62. The content distribution instruction allows a content to be distributed to the mobile communication terminal 2.

The content server 62 maintains various contents. The content server 62 distributes contents to the mobile communication terminal authenticated as a distribution-permitted terminal in accordance with a content distribution instruction from the authentication server 61. Multiple servers are provided for each type of contents. FIG. 2 shows an example of content servers 62a through 62d. For example, the content server 62a stores content A such as a music content. The content server 62b stores content B such as an Internet radio content. The content server 62c stores content C such as a search service content. The content server 62d stores content D such as a reservation service content. Obviously, one content server can store multiple types of contents.

Figure 5:
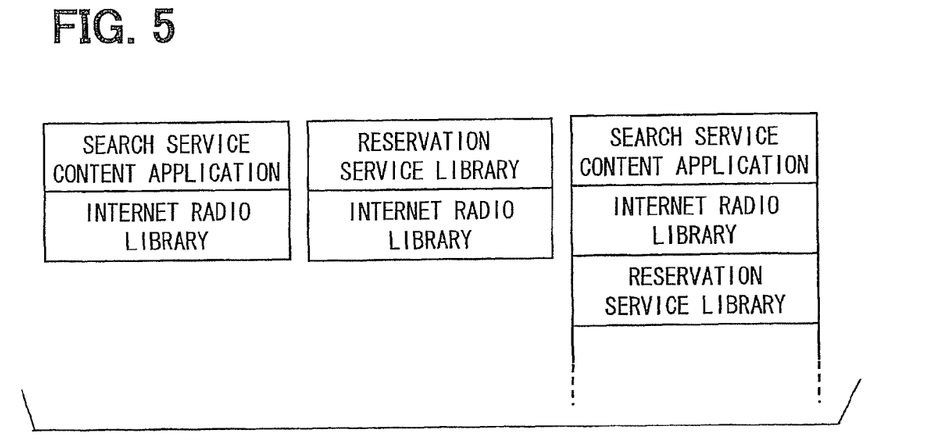
FIG. 5 schematically shows a content configuration.

The content application executes each content received from the mobile communication terminal 2. The in-vehicle apparatus 3 can supply each content application with multiple functions as libraries. As shown in FIG. 5, for example, an Internet radio function can be added to the content application that executes the search service content. Moreover, the Internet radio function can be added to the content application that executes the reservation service content. In either case, the Internet radio function is added as a library. Accordingly, the Internet radio can be broadcast while a search process provides search services including gourmet destinations and traveling according to the search service content. The Internet radio can also be broadcast while a reservation process provides reservation services including movie tickets and restaurants according to the reservation service content. This enables to simultaneously provide a main content service and a supplementary service subordinate to the main one. As another example, the content application to execute the search service content can be additionally provided with the Internet radio function or the reservation service function as a library. That is, multiple functions can be added to one content application that executes one content.

The mobile communication terminal authenticated as a distribution-permitted terminal can directly access the content server 62 without accessing the authentication server 61.

The above-mentioned profiles contain SPP as a predetermined or specified communication standard. Establishing the SPP connection communicably connects the mobile communication terminal 2 and the in-vehicle apparatus 3 with each other.

When the connection is established, the SPP profile can indicate an apparatus that requested the connection or an apparatus that is defined as a communication party. According to SPP, one apparatus, that is, the in-vehicle apparatus 3 as a connection requester activates a virtual serial port. The in-vehicle apparatus 3 outputs a connection request to the other apparatus, that is, the mobile communication terminal 2 as a communication party. After activating the virtual serial port, the in-vehicle apparatus 3 notifies a signal "spp (in-vehicle apparatus 3)" to the mobile communication terminal 2 as the communication party. The signal specifies the in-vehicle apparatus 3 itself as the connection requester. The mobile communication terminal 2 as the communication party is notified of the connection request from the in-vehicle apparatus 3. Based on the notification information, the mobile communication terminal 2 identifies that the connection requester is the in-vehicle apparatus 3. The mobile communication terminal 2 then establishes the SPP connection with the connection requester. Based on the SPP notification information, the mobile communication terminal 2 can determine whether the BT communication party is the in-vehicle apparatus 3 if the BT communication line is established between both. The mobile communication terminal 2 according to the embodiment can determine communicable connection to the in-vehicle apparatus 3 using the SPP function, i.e., based on the determination of successful or unsuccessful SPP connection establishment. When communicably connected to the in-vehicle apparatus 3, the mobile communication terminal 2 notifies a signal "spp (mobile communication terminal 2)" to the in-vehicle apparatus 3, for example. The signal is provided as successful connection information that indicates the connection establishment. This enables the in-vehicle apparatus 3 to identify that the communication party of the established BT communication is the mobile communication terminal 2. The in-vehicle apparatus 3 according to the embodiment can also determine communicable connection to the mobile communication terminal 2 using the SPP function, i.e., based on the determination of successful or unsuccessful SPP connection establishment.

The SPP profile ensures a high degree of freedom so that it can specify any commands and transmit or receive a variety of information and data. The mobile communication terminal 2 and the in-vehicle apparatus 3 according to the embodiment need to transmit or receive a variety of information and data and therefore use SPP as a BT communication profile.

Figure 6:
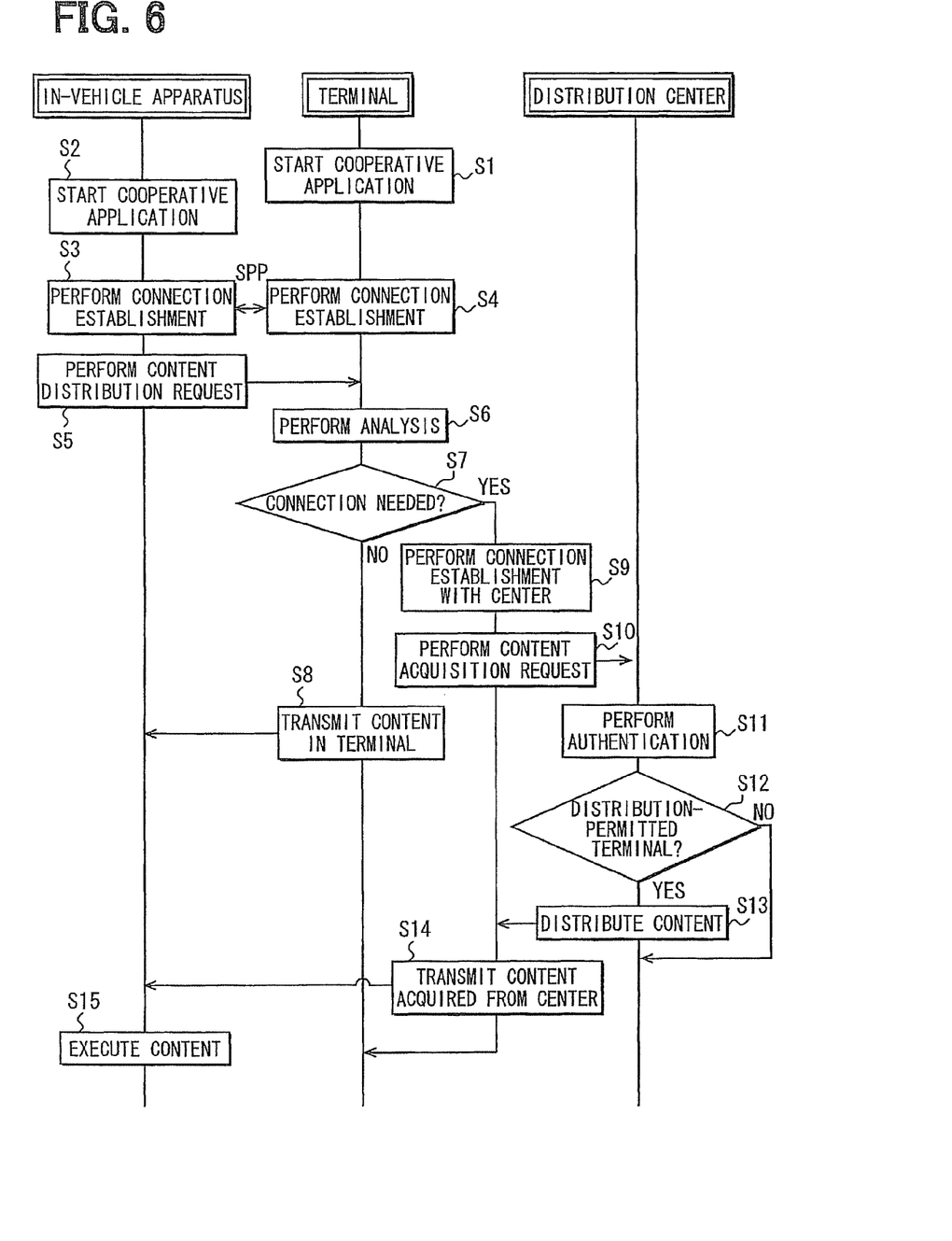
FIG. 6 is a flowchart showing control over cooperation of the mobile communication terminal and the in-vehicle apparatus.

With reference to FIG. 6, the following describes operations of the vehicular communication system 1 according to the above-mentioned configuration. To actually perform processes to be described, the mobile communication terminal 2 uses the terminal controller 5. The in-vehicle apparatus 3 uses the apparatus controller 31. The distribution center 4 uses a center controller (not shown) included in the authentication server 61. For ease of description, the following description mainly refers to the mobile communication terminal 2, the in-vehicle apparatus 3, and the distribution center 4.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

In response to a user manipulation, the mobile communication terminal 2 starts its cooperative application (S1) before or immediately after the mobile communication terminal 2 is carried into a vehicle compartment. While the mobile communication terminal 2 activates its cooperative application, the in-vehicle apparatus 3 starts its cooperative application (S2) in response to a user manipulation. The mobile communication terminal 2 and the in-vehicle apparatus 3 then perform a connection establishment process based on SPP (S3 and S4). The mobile communication terminal 2 and the in-vehicle apparatus 3 are now communicably connected to each other.

Suppose the mobile communication terminal 2 activates its cooperative application and is carried into the vehicle compartment while content A is executed. In this case, establishing the SPP connection terminates content A. The user needs to manipulate the touch panel of the in-vehicle apparatus 3 and re-execute an intended content.

The in-vehicle apparatus 3 communicably connects with the mobile communication terminal 2 according to SPP and then performs a content distribution request process (S5) in accordance with a user manipulation on the touch panel. Using the content distribution request process, the in-vehicle apparatus 3 transmits content distribution request information to the mobile communication terminal 2 based on SPP. The content distribution request information requests the content distribution. The content distribution request information contains information to specify the content such as the type of requested content.

The mobile communication terminal 2 receives the content distribution request information from the in-vehicle apparatus 3 and then performs an analysis process for the information (S6). Using the analysis process, the mobile communication terminal 2 determines whether it needs to connect with the distribution center 4 in order to acquire the content the in-vehicle apparatus 3 requests to distribute. The mobile communication terminal 2 analyzes the content distribution request information to specify the content the in-vehicle apparatus 3 requests to distribute. The mobile communication terminal 2 may contain the specified content at the time point. In this case, the mobile communication terminal 2 determines that it need not connect with the distribution center 4. The mobile communication terminal 2 may not contain the specified content at the time point. In this case, the mobile communication terminal 2 determines that it needs to connect with the distribution center 4.

As a result of the analysis process, the mobile communication terminal 2 may determine that it does not need to connect with the distribution center 4 (NO at S7). That is, the mobile communication terminal 2 may contain the content the in-vehicle apparatus 3 requests to distribute. In this case, the mobile communication terminal 2 does not establish connection with the distribution center 4 and passes the content to the in-vehicle apparatus 3 (S8).

As a result of the analysis process, the mobile communication terminal 2 may determine that it needs to connect with the distribution center 4 (YES at S7). That is, the mobile communication terminal 2 may not contain the content the in-vehicle apparatus 3 requests to distribute. In this case, the mobile communication terminal 2 performs a connection establishment process with the distribution center 4 (S9).

The mobile communication terminal 2 establishes connection with the distribution center 4 and then performs a content acquisition request process (S10). Using the content acquisition request process, the mobile communication terminal 2 transmits the content distribution request information received from the in-vehicle apparatus 3 to the distribution center 4.

The distribution center 4 receives the content distribution request information from the mobile communication terminal 2 and then performs an authentication process for the mobile communication terminal (S11). Using the authentication process, the distribution center 4 determines whether the mobile communication terminal 2 used to transmit the content distribution request information is an already registered terminal. If the mobile communication terminal 2 is a registered terminal, the distribution center 4 authenticates the mobile communication terminal as a distribution-permitted terminal that is allowed to distribute contents. If the mobile communication terminal 2 is not a registered terminal, the distribution center 4 does not authenticate the mobile communication terminal as a distribution-permitted terminal.

Based on the authentication process, the distribution center 4 may authenticate the mobile communication terminal 2 used to transmit the content distribution request information as a distribution-permitted terminal (YES at S12). In this case, the distribution center 4 distributes the distribution-requested content to the mobile communication terminal 2 (S13). On the other hand, the distribution center 4 may not authenticate the mobile communication terminal 2 used to transmit the content distribution request information as a distribution-permitted terminal (NO at S12). In this case, the distribution center 4 distributes no content to the mobile communication terminal 2.

The mobile communication terminal 2 acquires the content distributed from the distribution center 4 and passes the content to the in-vehicle apparatus 3 (S14). The in-vehicle apparatus 3 allows its content execution section 51 to execute the content received from the mobile communication terminal 2 (S15). The received content may be already contained in the mobile communication terminal 2 when the distribution request was issued; thus, the already contained content is transmitted at S8. Alternatively, the received content may be acquired by the mobile communication terminal 2 from the distribution center 4 in response to the distribution request; thereby, the acquired content is then transmitted at S14.

Figure 7:
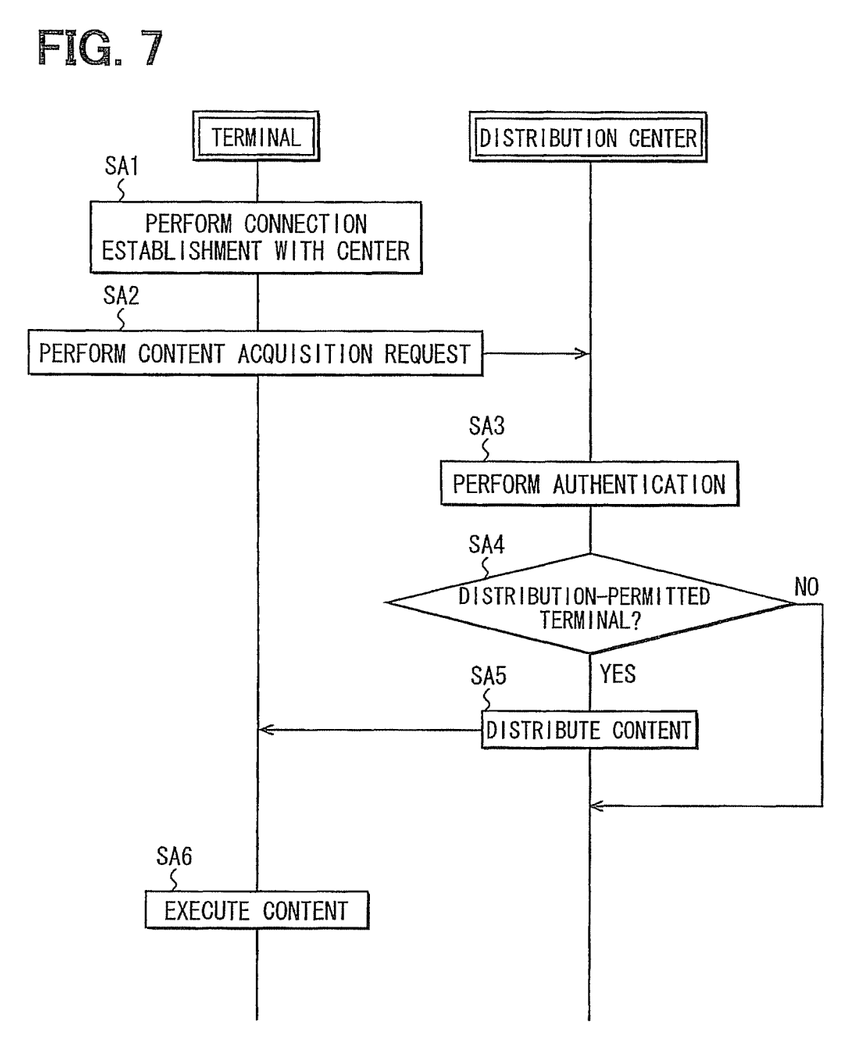
FIG. 7 is a flowchart showing control over independent operation of the mobile communication terminal.

With reference to FIG. 7, the following describes control over independent operation of the mobile communication terminal 2. Suppose the mobile communication terminal 2 is not communicably connected to the in-vehicle apparatus 3. In this case, the mobile communication terminal 2 performs a connection establishment process with the distribution center 4 in response to a user manipulation on the mobile communication terminal 2 (SA1).

The mobile communication terminal 2 establishes connection with the distribution center 4 and then performs a content acquisition request process (SA2). Using the content acquisition request process, the mobile communication terminal 2 transmits content distribution request information to the distribution center 4. For example, the content distribution request information specifies a content requested for distribution in response to a user manipulation on the mobile communication terminal 2.

The distribution center 4 receives the content distribution request information from the mobile communication terminal 2 and then performs an authentication process for the mobile communication terminal (SA3). The authentication process is equal to S11 in FIG. 6. Using the authentication process, the distribution center 4 may authenticate the mobile communication terminal 2 used to transmit the content distribution request information as a distribution-permitted terminal (YES at SA4). In this case, the distribution center 4 distributes the requested content to the mobile communication terminal 2 (SA5). On the other hand, the distribution center 4 may not authenticate the mobile communication terminal 2 used to transmit the content distribution request information as a distribution-permitted terminal (NO at SA4). In this case, the distribution center 4 distributes no content to the mobile communication terminal 2. The mobile communication terminal 2 acquires the content distributed from the distribution center 4 and then executes the content using its content execution section 21 (SA6).

According to the embodiment as described above, the vehicular communication system 1 includes the distribution center 4, the mobile communication terminal 2, and the in-vehicle apparatus 3. The distribution center 4 distributes contents. The mobile communication terminal 2 includes the content acquisition section 22 and the terminal-side application. The content acquisition section 22 acquires contents distributed from the distribution center 4. The terminal-side application executes contents. The in-vehicle apparatus 3 is communicably connected to the mobile communication terminal 2 and includes the vehicle-side application that executes contents. In the vehicular communication system 1, the mobile communication terminal 2 and the in-vehicle apparatus 3 may not be connected with each other. In this case, the mobile communication terminal 2 uses its terminal-side application to execute a content acquired by the content acquisition section 22. On the other hand, the mobile communication terminal 2 and the in-vehicle apparatus 3 may be connected with each other. In this case, the terminal-side application and the vehicle-side application can operate cooperatively with each other. The in-vehicle apparatus 3 uses its vehicle-side application to execute the content acquired by the content acquisition section 22.

The vehicular, communication system 1 provides the sophisticated mobile communication terminal 2 with the content acquisition section 22. The mobile communication terminal 2 primarily performs the content acquisition process to acquire contents from the distribution center 4. The vehicular communication system 1 can acquire contents from the distribution center 4 while taking full advantage of the high performance of the mobile communication terminal 2.

When connected with the in-vehicle apparatus 3, the mobile communication terminal 2 allows the content acquisition section 22 to acquire a content in accordance with the result of analyzing a content distribution request transmitted from the in-vehicle apparatus 3. The in-vehicle apparatus 3 allows the distribution request processing section 52 to request a content to be distributed. The mobile communication terminal 2 allows the analysis section 23 to determine whether connection with the distribution center 4 is needed to acquire the content requested from, the in-vehicle apparatus 3. As a result from the analysis section 23, the mobile communication terminal 2 may determine that connection with the distribution center is necessary. In this case, the mobile communication terminal 2 establishes connection with the distribution center 4 and allows the content acquisition section 22 to acquire the content from the distribution center 4. The vehicular communication system 1 allows the sophisticated mobile communication terminal 2 to analyze the information and acquires contents from the distribution center 4.

The mobile communication terminal 2 and the in-vehicle apparatus 3 each include the cooperative application. The cooperative application allows the mobile communication terminal 2 and the in-vehicle apparatus 3 to be cooperative with each other when both are communicably connected. According to the operation disclosed in the embodiment, the mobile communication terminal 2 starts its cooperative application. A user manipulation starts a vehicular cooperative application on the in-vehicle apparatus 3. The in-vehicle apparatus 3 requests the mobile communication terminal 2 to establish connection based on a specific predetermined profile such as SPP. The SPP connection is established in accordance with the request. This enables cooperation between the cooperative application on the mobile communication terminal 2 and the cooperative application on the in-vehicle apparatus 3. The disclosed operation is provided as an example of the process that cooperatively operates the mobile communication terminal 2 and the in-vehicle apparatus 3. Accordingly, the present disclosure is not limited to this example. As another example, the in-vehicle apparatus 3 may start its cooperative application. In this state, the mobile communication terminal 2 may start its cooperative application. Then, the mobile communication terminal 2 and the in-vehicle apparatus 3 may come to operate cooperatively with each other. As still another example, the cooperative application of the mobile communication terminal 2 may start simultaneously with the cooperative application of the in-vehicle apparatus 3. Then, the mobile communication terminal 2 and the in-vehicle apparatus 3 may come to operate cooperatively with each other.

According to the embodiment, the mobile communication terminal 2 and the in-vehicle apparatus 3 are communicably connected with each other when connection is established in accordance with one specific profile such as SPP. That is, the vehicular communication system 1 uses only one resource for various data related to a content exchanged between the mobile communication terminal 2 and the in-vehicle apparatus 3. When cooperative, the mobile communication terminal 2 and the in-vehicle apparatus 3 can execute only one content based on the one resource. However, there may be provided an additional function that differs from the content execution function and can execute simultaneously with the same. Such an additional function may be supplied as a library to the application that executes each content. In this manner, the in-vehicle apparatus 3 can provide multiple functions by executing one content even when the mobile communication terminal 2 and the in-vehicle apparatus 3 cooperate with each other using the one resource.

The communication standard is not limited to SPP. There may be provided multiple connections used for the cooperation to be established between the mobile communication terminal 2 and the in-vehicle apparatus 3. This enables multiple contents to be executed simultaneously. One SPP does not signify one type of profile. It also signifies one of established SPP connections.

The mobile communication terminal 2 and the in-vehicle apparatus 3 can be communicably connected to each other based on multiple specific profiles rather than one specific profile. In this case, the vehicle-side application may contain multiple applications to execute respective associated contents; the number of the multiple applications may be greater than the number of the specific profiles (i.e., the resources to cooperatively connect the mobile communication terminal 2 and the in-vehicle apparatus 3 with each other). Also in such a case, each application may contain a library that provides a function different from the content execution function to execute the content. This enables the content execution function and the different function to execute simultaneously.

The distribution center 4 includes the authentication server 61 and the content server 62. The authentication server 61 authenticates the mobile communication terminal 2 whose connection is established. The content server 62 supplies a content to the mobile communication terminal authenticated by the authentication server 61. The distribution center 4 may be provided with the authentication function or a charge management function. Accordingly, the content server 62 can manage the mobile communication terminal 2 to which contents are distributed. This can prevent contents from being distributed unnecessarily. That is, it is possible to prevent distributing contents to a mobile communication terminal disallowed for content distribution or prevent unauthorized access to the distribution center 4 from outside.

Once authenticated by the authentication server 61, the mobile communication terminal 2 can directly access the content server 62 without subsequent authentication from the authentication server 61. This enables to decrease processing load on the authentication server or shorten the time for the mobile communication terminal 2 to acquire contents.

The present disclosure is not limited to the above-mentioned embodiment but is applicable to various embodiments within the spirit and scope of the present disclosure. For example, the present disclosure can be modified or enhanced as follows.

According to the above-mentioned example, the smart phone is used as the mobile communication terminal 2. The mobile communication terminal 2 may represent mobile telephones sophisticated similarly to smart phones or other communication terminals.

According to the above-mentioned configuration, the telephone communication portion 6 receives contents via the communication network 100. For example, the mobile communication terminal 2 may acquire contents using a wireless LAN or WiMAX (Worldwide Interoperability for Microwave Access).

The above-mentioned content types, window displays, application program types, and execution states are provided as mere examples. The present disclosure is not limited thereto. For example, a content may be streamed or downloaded to the mobile communication terminal 2 after the content is acquired.

According to the above-mentioned example, the navigation system is used for the in-vehicle apparatus 3 as a vehicular apparatus. The present disclosure is not limited thereto. For example, the storage portion 34 may store an application program having the navigation function. The in-vehicle apparatus 3 may be provided as a vehicular apparatus that enables the navigation function when a user starts the application program. The vehicular apparatus may be configured as an in-vehicle apparatus built into a vehicle or as a mobile wireless unit attachable to and detachable from the vehicle.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular communication system comprising:
a distribution center that distributes a content;
a mobile communication terminal including
  a content acquisition section to acquire the content distributed from the distribution center and
  a terminal-side application to execute the content; and
a vehicular apparatus that is enabled to be communicably connected with the mobile communication terminal and includes a vehicle-side application to execute a content,
wherein:
when the mobile communication terminal and the vehicular apparatus are not connected, the terminal-side application of the mobile communication terminal executes the content acquired by the content acquisition section,
when the mobile communication terminal and the vehicular apparatus are connected, the terminal-side application and the vehicle-side application cooperate with each other and the vehicle-side application of the vehicular apparatus executes the content acquired by the content acquisition section of the mobile communication terminal,
the vehicular apparatus further includes a distribution request section to request a content that is distributed to the vehicular apparatus,
the mobile communication terminal further includes an analysis section to determine whether a connection with the distribution center is necessary in order to acquire the content requested by the distribution request section for distribution,
the analysis section determines that the connection with the distribution center is necessary when the content requested by the distribution request section is not contained in the mobile communication terminal,
the analysis section determines that the connection with the distribution center is unnecessary when the content requested by the distribution request section is contained in the mobile communication terminal,
when the analysis section determines that the connection with the distribution center is necessary, the content acquisition section establishes a connection with the distribution center, and acquires, from the distribution center, the content requested, and
when the analysis section determines that the connection with the distribution center is unnecessary, the content acquisition section acquires, as the content requested, the content contained in the mobile communication terminal.

2. The vehicular communication system according to claim 1, wherein:
when the mobile communication terminal and the vehicular apparatus are connected, the mobile communication terminal causes the content acquisition section to acquire the content in accordance with a result of analyzing a request transmitted from the vehicular apparatus.

3. The vehicular communication system according to claim 1, wherein:
when a user manipulation activates the vehicle-side application under a state where the terminal-side application is activated,
a connection of a predetermined profile between the vehicular apparatus and the mobile communication terminal is established based on a profile connection request from the vehicular apparatus to the mobile communication terminal to connect the predetermined profile, to enable the terminal-side application and the vehicle-side application to operate in cooperation.

4. The vehicular communication system according to claim 1, wherein:
the mobile communication terminal and the vehicular apparatus are configured to be communicably connected using a single predetermined profile;
the vehicle-side application includes a plurality of applications, each of the plurality of applications executing an associated content that is associated with the each of the plurality of applications; and
the each of the plurality of applications includes
  a content execution function to execute the associated content and
  a library to provide a function different from the content execution function to execute the associated content, the content execution function and the different function being enabled to be simultaneously executed.

5. The vehicular communication system according to claim 1, wherein:
the mobile communication terminal and the vehicular apparatus are configured to be communicably connected using a plurality of predetermined profiles;
the vehicle-side application includes a plurality of applications, each of the plurality of applications executing an associated content that is associated with the each of the plurality of applications, a number of the plurality of applications being greater than a number of the plurality of predetermined profiles; and
the each of the plurality of applications includes
  a content execution function to execute the associated content and
  a library to provide a function different from the content execution function to execute the associated content, the content execution function and the different function being enabled to be simultaneously executed.

6. The vehicular communication system according to claim 1, wherein:
the distribution center includes
  an authentication server that authenticates the mobile communication terminal and
  a content server that provides the content to the mobile communication terminal authenticated by the authentication server.

7. The vehicular communication system according to claim 6, wherein:
the mobile communication terminal, once authenticated by the authentication server, is enabled to directly access the content server.

8. A mobile communication terminal included in a vehicular communication system together with a distribution center and a vehicular apparatus, the distribution center distributing a content, the vehicular apparatus including a vehicle-side application to execute a content, the mobile communication terminal comprising:
a content acquisition section to acquire a content distributed from the distribution center;
a terminal-side application to execute the content; and
an analysis section that determines whether a connection with the distribution center is necessary in order to acquire a content requested by the vehicular apparatus upon receiving a request of distributing the content requested from the vehicular apparatus, wherein
when the mobile communication terminal and the vehicular apparatus are not communicatively connected, the terminal-side application of the mobile communication terminal executes the content acquired by the content acquisition section,
when the mobile communication terminal and the vehicular apparatus are communicatively connected, the terminal-side application and the vehicle-side application cooperate with each other and the content acquisition section acquires a content from the distribution center and transmits the content to the vehicular apparatus to enable the vehicle-side application of the vehicular apparatus to execute the content,
the analysis section determines that the connection with the distribution center is necessary when the content requested by the vehicular apparatus is not contained in the mobile communication terminal,
the analysis section determines that the connection with the distribution center is unnecessary when the content requested by the vehicular apparatus is contained in the mobile communication terminal,
when the analysis section determines that the connection with the distribution center is necessary, the content acquisition section establishes a connection with the distribution center, and acquires, from the distribution center, the content requested, and
when the analysis section determines that the connection with the distribution center is unnecessary, the content acquisition section acquires, as the content request, the content contained in the mobile communication terminal.

9. A vehicular apparatus included in a vehicular communication system together with a distribution center and a mobile communication terminal, the distribution center distributing a content, the mobile communication terminal including a content acquisition section to acquire a content that is distributed from the distribution center and a terminal-side application to execute the content, the vehicular apparatus being enabled to be communicably connected with the mobile communication terminal,
the vehicular apparatus comprising:
a vehicle-side application to execute a content; and
a distribution request section to request from the mobile communication terminal a content that is distributed to the vehicular apparatus, wherein
when the mobile communication terminal and the vehicular apparatus are communicatively connected, the terminal-side application and the vehicle-side application cooperate with each other and the vehicle-side application of the vehicular apparatus executes the content acquired from the distribution center by the content acquisition section of the mobile communication terminal,
when the content requested is not contained in the mobile communication terminal, the mobile communication terminal transmits to the vehicular apparatus, as the content requested, the content acquired from the distribution center, and when the content requested is contained in the mobile communication terminal, the mobile communication terminal transmits to the vehicular apparatus, as the content requested, the content contained in the mobile communication apparatus.

10. The vehicular communication system according to claim 1, wherein
the vehicle-side application of the vehicular apparatus acquires the content requested, from the distribution center via the mobile communication terminal.

11. The vehicular communication system according to claim 1, wherein
when the terminal-side application and the vehicle-side application are activated by the mobile communication terminal and the vehicular apparatus, respectively, a connection is established between the vehicular apparatus and the mobile communication terminal.

12. A program product stored in a non-transitory computer readable storage medium comprising instructions for execution by a computer, the instructions including a computer-implemented method for a mobile communication terminal included in a vehicular communication system together with a distribution center and a vehicular apparatus, the distribution center distributing a content, the vehicular apparatus including a vehicle-side application to execute the content,
the mobile communication terminal including (i) a content acquisition section to acquire a content distributed from the distribution center and (ii) a terminal-side application to execute the content,
wherein:
when the mobile communication terminal and the vehicular apparatus are not communicatively connected, the terminal-side application of the mobile communication terminal executes the content acquired by the content acquisition section; and
when the mobile communication terminal and the vehicular apparatus are communicatively connected, the terminal-side application and vehicle-side application cooperate with each other and the content acquisition section acquires a content from the distribution center and transmits the content to the vehicular apparatus to enable the vehicle-side application of the vehicular apparatus to execute the content,
the instructions for implementing the steps of:
receiving, from the vehicular apparatus, a request that requests a content that is distributed to the vehicular apparatus;
determining whether a connection with the distribution center is necessary in order to acquire the content requested from the vehicular apparatus,
determining that the connection with the distribution center is necessary when the content requested is not contained in the mobile communication terminal, whereas
determining that the connection with the distribution center is unnecessary when the content requested is contained in the mobile communication terminal; and
acquiring the content requested by establishing a connection with the distribution center to acquire, from the distribution center, the content requested when the connection with the distribution center is determined to be necessary; and
acquiring the content requested, from inside of the mobile communication terminal, when the connection with the distribution center is determined to be unnecessary.

13. The program product according to claim 12, further comprising the instructions being for further implementing the steps of:
establishing a connection between the vehicular apparatus and the mobile communication terminal when the terminal-side application and the vehicle-side application are activated by the mobile communication terminal and the vehicular apparatus, respectively, before the step of receiving the request.

14. A program product stored in a non-transitory computer readable storage medium comprising instructions for execution by a computer, the instructions including a computer implemented method for a computer of a mobile communication terminal, the mobile communication terminal being in communication with a distribution center and a vehicular apparatus, wherein the distribution center distributes a content and the vehicular apparatus includes a vehicle-side application to execute the content, the program product instructs the mobile communication terminal to execute steps comprising:
acquiring a content distributed from the distribution center;
executing the content acquired when the mobile communication terminal is not in communication with the vehicular apparatus;
transmitting the content acquired from the distribution center to the vehicular apparatus when the mobile terminal is in communication with the vehicle apparatus;
receiving a request of a content distributed to the vehicular apparatus from the vehicular apparatus;
determining whether a connection with the distribution center is necessary in order to acquire the content requested from the vehicular apparatus;
determining that the connection with the distribution center is necessary when the content requested is not contained in the mobile communication terminal;
determining that the connection with the distribution center is unnecessary when the content requested is contained in the mobile communication terminal;
acquiring the content requested by establishing a connection with the distribution center to acquire, from the distribution center, the content requested when the connection with the distribution center is determined to be necessary; and
acquiring the content requested from within the mobile communication terminal when the connection with the distribution center is determined to be unnecessary.

15. The program product of claim 14 further instructs the mobile communication terminal to execute step comprising:
establishing a connection with the vehicular apparatus when the terminal-side application and the vehicle-side application are activated by the mobile communication terminal and the vehicular apparatus, respectively, before the step of receiving the request from the vehicular apparatus.

* * * * *